R. A. LACHMANN.
ROLLER AND BEARING FOR SAME.
APPLICATION FILED MAY 10, 1915.

1,170,450.

Patented Feb. 1, 1916.
5 SHEETS—SHEET 1.

Fig. 1.

INVENTOR.
Robert A. Lachmann
BY
Barnett & Numan
ATTORNEYS

R. A. LACHMANN.
ROLLER AND BEARING FOR SAME.
APPLICATION FILED MAY 10, 1915.

1,170,450.

Patented Feb. 1, 1916.
5 SHEETS—SHEET 2.

INVENTOR.
Robert A Lachmann
BY Barnett L Truman
ATTORNEYS

R. A. LACHMANN.
ROLLER AND BEARING FOR SAME.
APPLICATION FILED MAY 10, 1915.

1,170,450.

Patented Feb. 1, 1916.
5 SHEETS—SHEET 3.

INVENTOR.
Robert A. Lachmann
BY
Barnett & Truman
ATTORNEYS

UNITED STATES PATENT OFFICE.

ROBERT A. LACHMANN, OF CHICAGO, ILLINOIS, ASSIGNOR TO RAYMOND BROTHERS IMPACT PULVERIZER COMPANY, OF CHICAGO, ILLINOIS, A CORPORATION OF ILLINOIS.

ROLLER AND BEARING FOR SAME.

1,170,450.  Specification of Letters Patent.  Patented Feb. 1, 1916.

Application filed May 10, 1915. Serial No. 27,105.

*To all whom it may concern:*

Be it known that I, ROBERT A. LACHMANN, a citizen of the United States, residing at Chicago, in the county of Cook and State of Illinois, have invented certain new and useful Improvements in Rollers and Bearings for Same, of which the following is a specification.

My invention relates to a bearing for a revoluble element and more particularly to means for revolubly supporting the rollers of a grinding or pulverizing mill of the general type shown in the patent to Albert Raymond No. 775,069, November 15, 1904, in which the rollers are pivotally mounted with capacity for revolution on a central revolving shaft and operate against the inner perimeter of a circular element called the bull ring. This being the situation in which the constructions and arrangements constituting the present invention are particularly designed to be used, the invention will be described with this particular type of mill in view. I apprehend, however, that the invention might be used to advantage in other situations where similar conditions are present and, therefore, I do not wish to be considered as limiting my invention to this particular type of mill.

The invention, which is the outgrowth of considerable practical experience with pulverizing mills of the type mentioned, and of an effort to overcome defects which have developed in the operation of these mills, consists of certain novel devices and arrangements to be hereinafter described and claimed, relating to the bearings on which the rollers are supported having the following objects in view, among other of perhaps less importance which will hereinafter appear from the full description of the apparatus, to-wit: to provide for the thorough lubrication of all bearing surfaces with a minimum amount of lubricant; to effectively exclude dust and other injurious foreign matter from such bearing surfaces; to make it possible to use a lighter grade of lubricant than has heretofore been used, it having been customary heretofore to use a heavy grease which, in order that it should have sufficient body, has usually been thickened with a filler injurious to the bearing surfaces; to provide the structure with certain capacity for taking up the wear on the parts which inevitably results from use of the apparatus; to provide an arrangement whereby the roller turns upon a non-rotative shaft, an ordinary practice having been to key the roller to a shaft which turns in a sleeve or housing. The disadvantage of this latter construction is that the shaft is likely in time to become crystallized and eventually broken with the possibility of wrecking the mill. Certain features of the invention might be used in connection with a roller fixed to a rotative shaft.

A further object is to facilitate the introduction of the lubricant into the bearing when required; to improve and simplify the manufacture of the rollers; and generally speaking, to provide a structure which will be stronger, more durable and more economical of lubricant than those heretofore employed without being substantially more complicated or more expensive to manufacture.

A further object is to provide a construction which makes it possible to use oil as a lubricant instead of grease.

The invention is illustrated in certain preferred embodiments, in the accompanying drawings in which—

Like characters of reference designate like parts in the several figures of the drawings.

Referring first to Figs. 1 to 6 inclusive, 25 designates a housing formed with a trunnion clamp 26 for mounting the housing on a trunnion shaft 27, the housing being clamped to the shaft by bolts 28. The upper portion of the housing provides a lubricant chamber 29 closed by a cap 30 formed preferably with a threaded opening for a plug 31. The cap is kept in place by cotter pins 32 which extend through lugs 33 on the upper edge of the housing. The cap 30 is removed for filling when grease is used as a lubricant. If oil is used it may be poured into the lubricant chamber by removing the plug 31. The lower end 34 of the housing, which is generally cylindrical in form, receives a shaft 35 which is held firmly in the housing by means of clamping bolts 36, 37. The housing is formed with a longitudinal slit 38 in one side which preferably terminates within the ends of the housing. By driving a wedge into the slit 38 the housing can be expanded sufficiently to admit the shaft. The clamping bolt 36 preferably engages a circumferential groove 39 formed on the shaft. In order to prevent the lubricant in chamber 29 from working down between the shaft and the housing the latter is provided with a gasket 40, preferably of leather, which is seated in a groove 41 and has an interior diameter a trifle smaller than the diameter of shaft 35. The upper end of the shaft is slightly tapered as indicated at 42. The roller consists of an annular roll section 43 of hardened metal and of a hub portion 44 preferably made of softer metal for convenience in machining. These two sections are cast together. A portion of the bull ring against which the roller bears is shown at 45. The lower end of the shaft is formed with an enlargement or head 46 which carries the weight of the roller. The hub portion of the roller is provided interiorly with a bronze bushing 47 having a flange 48 which bears against the under side of the hub. Interposed between the head 46 and flange 48 of the bushing are thrust rings, preferably three in number. The upper ring 49 forms, in effect, a part of the roller, being secured to the roller by studs 50 which pass through the flange 48 of the bushing. Similarly the lower ring 51 is secured to the head 46 by studs 52. The intermediate ring 53 has a floating relation with respect to the rings above and below it. The rings 49, 51, 53 are preferably one or all of them provided on their bearing surfaces with grooves such as the groove 49ª shown in Figs. 5 and 6. The groove, it will be seen, is eccentrically arranged with respect to the ring and touches at diametrically opposed points the inner and outer circumferences of the ring. By this expedient the oil from the space 63 is carried against the longitudinal bearing surface on the shaft 35. The lower end of the shaft 35 is inclosed by a cap 54 which is secured to the roller 43 by bolts 55 which pass through tubular members 56 cast in the roller. The lower end of the hub member 44 is preferably tapered as indicated at 57, and a gasket 58 having originally an inside diameter a trifle smaller than the maximum diameter of the lower end of the hub, is arranged in a groove 59 formed in the cap 54. This gasket prevents the oil from working out and dust working in between the roller and the cap. The bolts 55 are preferably held in position by nuts 60, 61 and spring washer 61ª. The shaft 35 is formed with a longitudinally extending lubricant duct 62 which communicates with the lubricant space 63 in the cap 54 at the bottom of the shaft and also preferably through the cross ducts 64. Preferably a hollow plug 65 is threaded into the upper end of the lubricant duct 62. The opening in the top of the plug is closed by a screen 66 of fine wire mesh which is held against a shoulder 67 formed on the plug by means of a cap 68, the upper face of which is a trifle below the upper surface of the screen 66. The lubricant is, therefore, purified before it passes into the duct 62, the sediment washing off the screen 66 and collecting in the lower part of the lubricant chamber below the level of the screen. The lubricant from chamber 29 passes down through duct 62 into the space 63 thence between the thrust rings and up along the bearing surfaces on the shaft 35 and bushing 47. Above the roller I provide a sealing device to prevent the outflow of lubricant at this place or at least to prevent the outflow, and consequent waste, of any greater quantity than is required to keep the bearing surfaces smooth and clean. To this end the housing 34 is formed at the bottom with an outstanding flange 67′ to which is secured, by a clamping ring 68′ and bolts 69 a flexible diaphragm 70. The diaphragm may be made of any suitable material. Preferably it is composed of plies of heavy linen fabric, such, for example, as the fabric used for making fire hose, treated to make it impervious to oil. The clamping ring 68′ preferably is formed with an upstanding rim 71 extending around the lower edge of flange 67′ for the purpose of relieving the clamping bolts from strains. The sealing ring 72 is secured, for example, by rivets 73 to the diaphragm 70, the rivets passing through a clamping ring 74 on the upper side of the diaphragm. The sealing ring 72 rests upon a machined surface 76 on the upper end of the hub 44 of the roller; although any suitable means might be employed for providing the roller with a smooth bearing surface for ring 72. Preferably springs are provided for keeping the ring 72 in close contact with the hub of the roller. For example, I may employ a plurality of coiled springs 77 which are seated in recesses 78 formed in the housing 34 and bear upon the clamping ring 74 on the upper side of the diaphragm. In order to prevent torsion on the diaphragm 70 the housing is formed with one or more recesses 79 into which extend studs 80 riveted to the clamping ring 74. This arrangement prevents the rotary movement of the roller from being transmitted through the sealing ring 72 to the diaphragm while permitting the sealing ring a certain amount of vertical movement necessary, or at least desirable, in order that the ring may provide an effective seal even after the roller and the elements supporting the same have become worn through use. The diaphragm also allows a certain amount of rocking or side motion on the roller.

Figure 1:
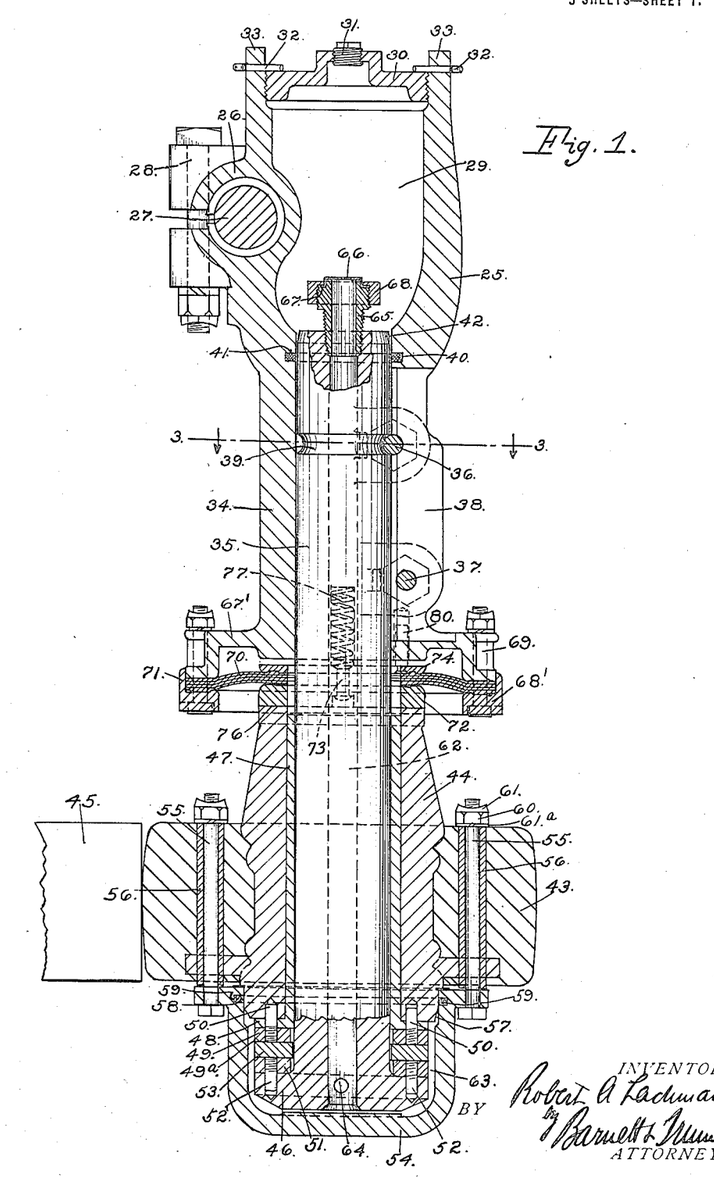
Figure 1 is a longitudinal sectional view taken through the roller and its supporting shaft and housing, showing also a part of the bull ring.
Figure 2:
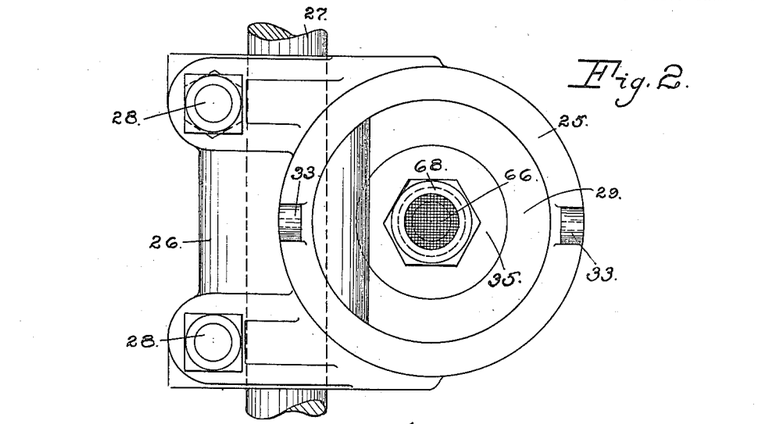
Fig. 2 is a plan view of the housing showing the cap for closing the lubricant chamber removed.
Figure 3:
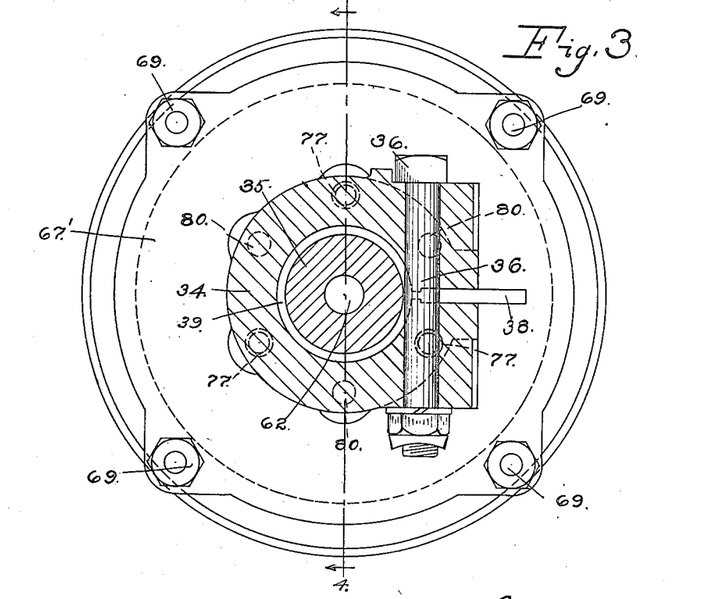
Fig. 3 is a sectional plan, on an enlarged scale, taken on line 3—3 of Fig. 1.
Figure 4:
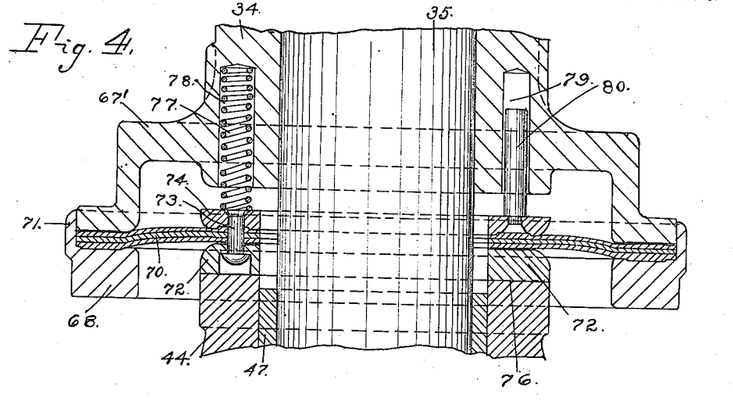
Fig. 4 is a fragmentary longitudinal sectional view on line 4—4 of Fig. 3.
Figure 5:
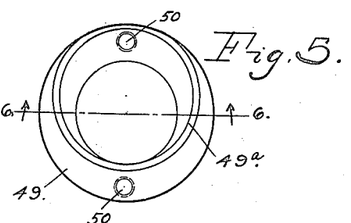
Fig. 5 is a plan view of one of the thrust rings at the lower end of the roller.
Figure 6:
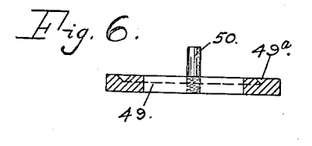
Fig. 6 is a sectional view on line 6—6 of Fig. 5.

Operation: It will be understood that a plurality of rollers are suspended so as to bear against the inner surface of the bull ring 45 and are given the motion of rotation so that they travel around the bull ring revolving on their respective bearing shafts 35. The grinding or pulverizing action takes place between the rollers and the bull ring. The lubrication of the bearing surfaces on the roll and on the elements associated therewith is accomplished as follows: The chamber 29 is filled with grease or oil. Preferably a relatively light oil is used and one of the advantages provided by my invention is that a lubricant of this character can be used whereas heretofore it has been necessary to employ relatively heavy greases in structures of this general type. Greases usually have a filler which is injurious to bearings. Moreover oil is more conveniently and cleanly handled than grease. The oil passes through the screen 66, the sediment, if any, settling down into the bottom of the chamber 29 from which it may be removed periodically. The lubricant passes through duct 62 into the lubricant space 63 in the cap 54 and thence between the ring 53 and rings 49 and 51 into contact with the shaft 35. It passes up between shaft 35 and the bushing 47 into the space above diaphragm 70. A certain portion of the lubricant, enough to keep the surfaces lubricated and prevent the entrance of dust, passes out between the sealing ring 72 and the upper surface 76 of the hub of the roller. The sealing ring 72 is kept pressed against the hub of the roller by the springs 77, and the pins 80 take the torsion of the roller from the diaphragm and also act as a guide to prevent cramping of the rings and diaphragm on the shaft. The flexibility of the diaphragm 70 and the fact that the sealing ring is spring pressed against its opposed bearing surface results in an intimate sealing contact between the ring and the roller hub which prevents any considerable quantity of lubricant from outflowing above the roller. It will be seen that the lubricant flows out of the bearing at one place only, namely, between the ring 72 and the roller. The flow of the lubricant is brought about by the head provided by the supply in the lubricant chamber 29 and duct 62 and by capillary attraction. Preferably the lubricant is positively forced against centrifugal force from the lubricant space 63 against the shaft 35 by the grooves 49ª formed on the thrust rings.

Figure 7:
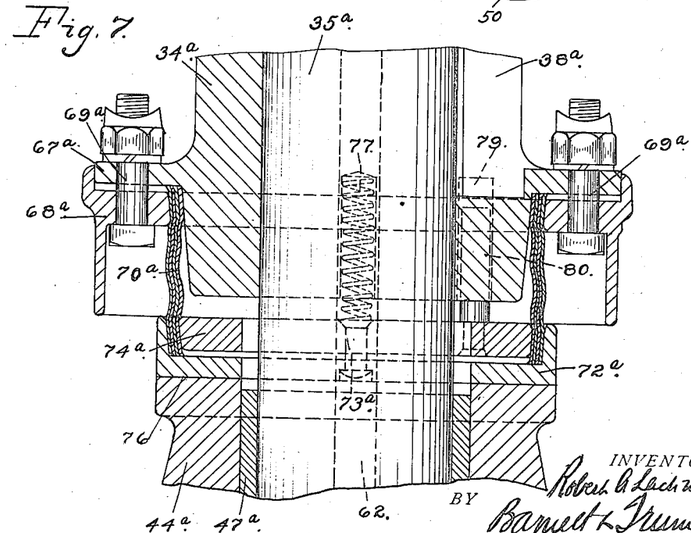
Figs. 7, 8 and 9 are views similar to Fig. 4 illustrating three different modifications.

In Fig. 7 I have shown a modified form of lubricant seal. The diaphragm 70ª is generally cylindrical in form, being made up preferably of a series of plies, without joints, of some flexible material such as the linen fabric used for making fire hose. The upper edge is clamped between a flange 67ª on the housing 34ª and a clamping ring 68ª by means of bolts 69ª. The sealing ring 72ª is formed with an upstanding flange between which and the clamping ring 74ª the lower edge of the diaphragm is secured, the clamping ring being fastened to the sealing ring by means of rivets 73ª. The other parts of the apparatus shown in Fig. 7 are exactly like the corresponding parts in the previously described form of the invention and are correspondingly indicated by reference numerals. It will be seen that the depending flange on the clamping ring 68ª protects the diaphragm in the same way as the clamping ring 68 protects the diaphragm in the form of the invention shown in the preceding figures.

Figure 8:
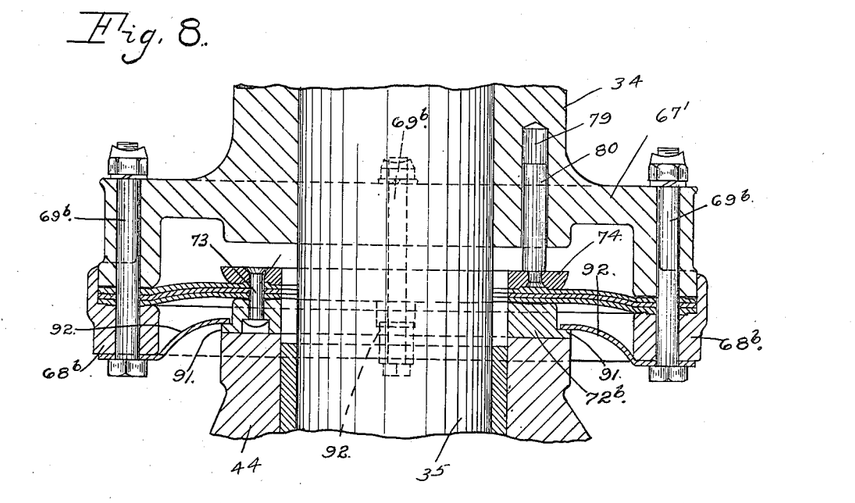
Figure 9:
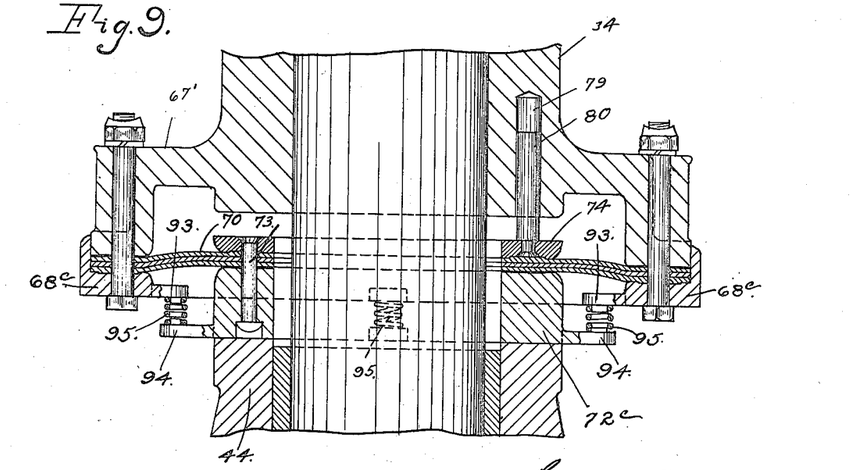

Two other modifications in the sealing arrangements are shown in Figs. 8 and 9. In Fig. 8 the sealing ring 72ᵇ is cut away so as to form a rim 91 against which bear leaf springs 92 which are bolted against the clamping rings 68ᵇ by the bolts 69ᵇ which bolt the clamping ring to the housing. In other respects the construction may be the same as that shown in Figs. 1 and 4. In Fig. 9 the clamping ring 68ᶜ is formed with lugs 93 and the sealing ring 72ᶜ with corresponding lugs 94. Between these pairs of lugs are arranged coiled springs 95 which serve to hold the sealing ring against the hub of the roller for taking up wear.

Figure 10:
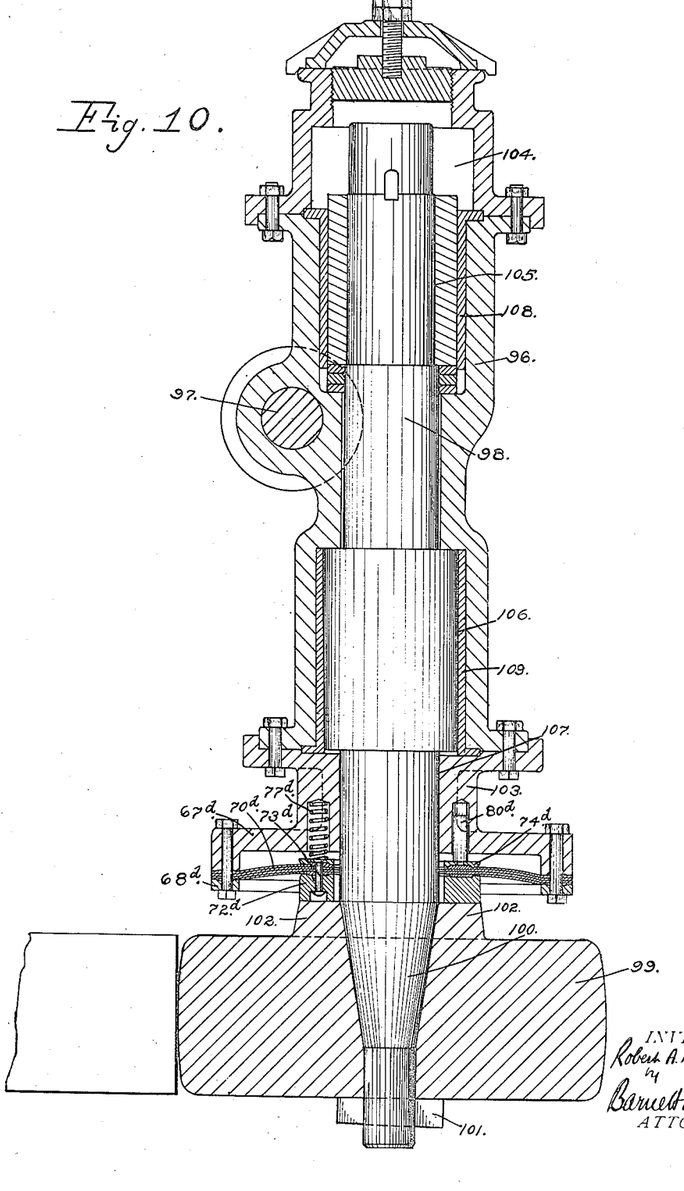
Fig. 10 is a longitudinal sectional view of a modified construction in which the roll is rigidly secured to a revoluble shaft.

One of the advantages of the improved roller and bearing, considering the entire structure as a whole, is that the roller revolves on a shaft which is fixed instead of being keyed to a revolving shaft, in which arrangement there is always some danger that the shaft will become bent so as not to turn freely in its bearings. With the roller keyed to a revolving shaft the continual vibratory bending movements of the shaft often crystallize the shaft causing it to break, possibly wrecking the entire mill. However, certain advantages of my present invention may be obtained by employing the lubricant seal disclosed herein in connection with a roller which is fixed to a revolving shaft. A construction of this sort is shown in Fig. 10. 96 designates the housing, 97 the trunnion shaft on which it is supported, 98 a shaft revolubly mounted in the housing and supported from lengthwise movement therein, and 99 the roller which is fitted upon the tapered end 100 of shaft 98 and held thereon by a key 101. The roller is formed with a hub 102 upon which bears a sealing ring 72ᵈ which is clamped to the diaphragm 70ᵈ by rivets 73ᵈ engaging a clamping ring 74ᵈ on the upper side of the diaphragm. The outer edge of the diaphragm is secured between a flange 67ᵈ formed on the lower member 103 of the housing and a clamping ring 68ᵈ. The arrangement of the springs 77ᵈ and studs 80ᵈ may be the same as that of the corresponding parts shown in Figs. 1 and 4. The housing is formed with a lubricant chamber 104 and the lubricant passes down between the bearing surfaces 105, 106, 107 on the shaft 98, and the inner surfaces of bushings 108, 109 and the inner surface of the lower housing member 103 against which the shaft bears. The lubricant seal above described prevents any excessive outflow of lubricant between the bearing surfaces of the shaft and the top of the roller; just enough of the lubricant passing between the lower face of sealing ring 72ᵈ and the upper face of hub 102 to keep these surfaces well lubricated and prevent the entrance of dust into the bearing.

While I have described my invention in certain preferred embodiments, it will be understood that further modifications might be made without departing from the principles of the invention. For example, the spring arrangements shown in Figs. 8 and 9 might be combined with the particular type of diaphragm shown in Fig. 7. Either form of diaphragm or any of the spring arrangements might be employed in the construction shown in Fig. 12 in which the roller is fixed to a revoluble shaft. Furthermore, my invention provides a number of different features of construction which are advantageously used in combination in the manner shown and described but which can be used singly with some advantage. Therefore I do not wish to be understood as limiting the invention to the precise constructions, arrangements, devices and combinations shown except so far as the claims are expressly so limited.

I claim:

1. In apparatus of the character described, the combination with a revoluble element and a non-revoluble element, of a lubricant seal comprising a flexible diaphragm secured to one of said elements, and a sealing member carried by the diaphragm which bears against said other element.

2. In apparatus of the character described, the combination with a revoluble element and a non-revoluble element, of a lubricant seal comprising a flexible diaphragm secured to one of said elements, a sealing member carried by the diaphragm which bears against said other element, and elastic means which presses the sealing member against the element upon which it bears.

3. In apparatus of the character described, the combination with a revoluble element and a non-revoluble element, of a lubricant seal comprising a flexible diaphragm secured to one of said elements, a sealing member carried by the diaphragm which bears against said other element, and means for engaging said sealing member with said first specified element so as to prevent torsion of the diaphragm while permitting movement as between said member and element in the direction of the axis of revolution of the revoluble element.

4. In apparatus of the character described, the combination with a revoluble element and a non-revoluble element, of a lubricant seal comprising a flexible diaphragm secured to one of said elements, a sealing member carried by the diaphragm which bears against said other element, means for engaging said sealing member with said first specified element so as to prevent torsion of the diaphragm while permitting movement as between said member and element in the direction of the axis of revolution of the revoluble element, and elastic means for pressing said sealing member against the element upon which it bears.

5. In apparatus of the character described, the combination with a revoluble element and a non-revoluble element, of a lubricating seal comprising a flexible diaphragm secured to one of said elements, a sealing ring carried by said diaphragm and adapted to bear against the other element, and studs on said ring, said first specified element being formed with recesses in which said studs have a sliding fit.

6. In apparatus of the character described, the combination with a revoluble element and a non-revoluble element, of a lubricating seal comprising a flexible diaphragm secured to one of said elements, a sealing ring carried by said diaphragm and adapted to bear against the other element, studs on said ring, said first specified element being formed with recesses in which said studs have a sliding fit, and elastic means for pressing said sealing ring against the element upon which it bears.

7. In apparatus of the character described, the combination with a revoluble element and a non-revoluble element, of a lubricating seal comprising a flexible diaphragm secured to one of said elements, a sealing ring carried by said diaphragm and adapted to bear against the other element, studs on said ring, said first specified element being formed with recesses in which said studs have a sliding fit, and spiral springs interposed between said first specified element and said sealing ring.

8. In apparatus of the character described, the combination with a revoluble element and a non-revoluble element, of a lubricant seal comprising a flexible diaphragm secured to the non-revoluble element, and a sealing element carried by said diaphragm which bears against said revoluble element.

9. In apparatus of the character described, the combination with a revoluble element and a non-revoluble element, of a lubricant seal comprising a flexible diaphragm secured to the non-revoluble element, a sealing element carried by said diaphragm which bears against said revoluble element, and elastic means which presses the sealing ring against said revoluble element.

10. In apparatus of the character described, the combination with a revoluble element and a non-revoluble element, of a lubricant seal comprising a flexible diaphragm secured to the non-revoluble element, a sealing element carried by said diaphragm which bears against said revoluble element, and means engaging said sealing member with a non-revoluble element to prevent torsion of the diaphragm while permitting movement as between said sealing member and the non-revoluble element in the direction of the revoluble element.

11. In apparatus of the character described, the combination with a revoluble element and a non-revoluble element, of a lubricating seal comprising a flexible diaphragm secured to said non-revoluble element, a sealing ring carried by said diaphragm and adapted to bear against the revoluble element, and studs on said ring, said non-revoluble element being formed with recesses in which said studs have a sliding fit.

12. In apparatus of the character described, the combination with a revoluble element and a non-revoluble element, of a lubricating seal comprising a flexible diaphragm secured to said non-revoluble element, a sealing ring carried by said diaphragm and adapted to bear against the revoluble element, studs on said ring, said non-revoluble element being formed with recesses in which said studs have a sliding fit, and elastic means to maintain the sealing ring in contact with said revoluble element.

13. In apparatus of the character described, the combination of a housing, a roller revoluble with respect to said housing and supported thereby, a lubricant seal comprising a flexible diaphragm secured to the housing, and a sealing ring carried by said diaphragm and bearing on said roller.

14. In apparatus of the character described, the combination of a housing, a roller revoluble with respect to said housing and supported thereby, a lubricant seal comprising a flexible diaphragm secured to the housing, a sealing ring carried by said diaphragm and bearing on said roller, and elastic means for maintaining the sealing ring in contact with the roller.

15. In apparatus of the character described, the combination of a housing, a roller revoluble with respect to said housing and supported thereby, a lubricant seal comprising a flexible diaphragm secured to the housing, a sealing ring carried by said diaphragm and bearing on said roller, and means engaging the sealing ring with said housing so as to prevent torsion of the diaphragm while permitting movement of the sealing ring in the direction of the axis of revolution of the roller.

16. In apparatus of the character described, the combination of a housing, a roller revoluble with respect to said housing and supported thereby, a lubricant seal comprising a flexible diaphragm secured to the housing, a sealing ring carried by said diaphragm and bearing on said roller, means engaging the sealing ring with said housing so as to prevent torsion of the diaphragm while permitting movement of the sealing ring in the direction of the axis of revolution of the roller, and elastic means for maintaining the sealing ring in contact with the roller.

17. In apparatus of the character described, the combination of a housing, a roller revoluble with respect to said housing and supported thereby, a lubricant seal comprising a flexible diaphragm secured to the housing, and a sealing ring carried by said diaphragm and bearing on said roller; said housing being formed with recesses and the diaphragm provided with studs adapted to have a sliding fit in said recesses.

18. In apparatus of the character described, the combination of a housing, a roller revoluble with respect to said housing and supported thereby, a lubricant seal comprising a flexible diaphragm secured to the housing, and a sealing ring carried by said diaphragm and bearing on said roller; said housing being formed with recesses and the diaphragm provided with studs adapted to have a sliding fit in said recesses, and springs interposed between the housing and said diaphragm.

19. In apparatus of the character described, the combination with a housing formed with an annular flange at one end, of a shaft fixed in said housing, a roller revolubly mounted on said shaft, a flexible diaphragm secured to said flange and surrounding the shaft, and a sealing ring carried by the diaphragm which bears against said roller.

20. In apparatus of the character described, the combination with a housing formed with an annular flange at one end, of a shaft fixed in said housing, a roller revolubly mounted on said shaft, a flexible diaphragm secured to said flange and surrounding the shaft, a sealing ring carried by the diaphragm which bears against said roller, and elastic means for maintaining said sealing ring in contact with said roller.

21. In apparatus of the character described, the combination with a housing formed with an annular flange at one end, of a shaft fixed in said housing, a roller revolubly mounted on said shaft, a flexible diaphragm secured to said flange and surrounding the shaft, a sealing ring carried by the diaphragm which bears against said roller, and elastic means for maintaining said sealing ring in contact with said roller, the housing being formed with recesses in which the pins have a sliding fit.

22. In apparatus of the character described, the combination with a housing, of a roller revoluble with respect to the housing and supported thereby, and a lubricant seal interposed between the housing and the roller comprising a sealing member which bears against the roller, and elastic means which forces said sealing member against the roller.

23. In apparatus of the character described, the combination with a housing, of a shaft fixed in said housing, a roller revolubly mounted on the shaft, sealing means interposed between the housing and the roller comprising a sealing ring which bears against the roller, and elastic means interposed between the housing and the sealing ring.

24. In apparatus of the character described, the combination with a shaft and a roller revolubly mounted thereon, of a housing into the lower end of which the upper end of said shaft fits snugly, the upper end of the housing providing a lubricant chamber, the lower portion of the housing being formed with a longitudinal slit which terminates below the upper end of the shaft, and clamping bolts which engage said housing on opposite sides of the slit therein.

25. In apparatus of the character described, the combination with a housing formed with a longitudinal slot in one side which terminates within the upper and lower edges of the housing, of a shaft fitted into the housing, clamping bolts which engage the housing at opposite sides of said shaft, and a roller revolubly mounted on said shaft.

26. In apparatus of the character described, the combination with a shaft terminating in a head, of a roller revoluble on said shaft, and one or more thrust rings between said head and roller, said ring or rings formed with a lubricating groove or grooves arranged so that the groove, in each case, touches the inner and outer circumference of the ring in which it is formed.

27. In apparatus of the character described, the combination of a housing formed with a lubricant chamber at its upper end, a shaft fixed in the lower end of said housing, and a roller revoluble on said shaft; the shaft being formed with a lubricating duct communicating with said lubricant chamber and extending lengthwise through the shaft.

28. In apparatus of the character described, the combination of a housing formed with a lubricant chamber at its upper end, a shaft fixed in the lower end of said housing, a roller revoluble on said shaft, the shaft being formed with a lubricating duct communicating with said lubricant chamber and extending lengthwise through the shaft, and means providing lubricant spaces around the shaft above and below said roller.

29. In apparatus of the character described, the combination of a housing formed with a lubricant chamber at its upper end, a shaft fixed in the lower end of said housing, a roller revoluble on said shaft, the shaft being formed with a lubricating duct communicating with said lubricant chamber and extending lengthwise through the shaft, and sealing means to check the escape of lubricant at the upper end of the roller.

30. In apparatus of the character described, the combination of a housing formed with a lubricant chamber at its upper end, a shaft fixed in the lower end of said housing and a roller revoluble on said shaft; the shaft being formed with a lubricating duct communicating with said lubricant chamber and extending lengthwise through the shaft, and a strainer between the lubricant chamber and duct which is arranged above the bottom of the chamber.

31. In apparatus of the character described, the combination of a housing formed with a lubricant chamber in its upper end, a shaft fixed in the lower end of the housing, a roller revoluble on said shaft, and means providing a thrust bearing for the lower end of the roller; said shaft being formed with a lubricant duct communicating with said lubricant chamber and adapted to deliver lubricant to said thrust bearing.

32. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, one or more thrust rings interposed between the head and the roller, and a cap inclosing the lower end of the shaft which provides a lubricant space in communication with said lubricant duct.

33. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, one or more thrust rings interposed between the head and the roller, a cap inclosing the lower end of the shaft which provides a lubricant space in communication with said lubricant duct, and sealing means for checking the outflow of lubricant above the roller.

34. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, a bushing between the roller and shaft having a flange bearing against the under side of the roller, and one or more thrust rings between said head and the flange on said bushing.

35. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, one or more thrust rings interposed between the head and the roller, a cap inclosing the lower end of the shaft which provides a lubricant space in communication with said lubricant duct, comprising a diaphragm secured to the lower end of the housing, and a sealing ring on the diaphragm which bears upon the upper end of the roller.

36. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, one or more thrust rings interposed between the head and the roller, a cap inclosing the lower end of the shaft which provides a lubricant space in communication with said lubricant duct, comprising a diaphragm secured to the lower end of the housing, a sealing ring on the diaphragm which bears upon the upper end of the roller, and springs which force said sealing ring against the roller.

37. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, one or more thrust rings interposed between the head and the roller, a cap inclosing the lower end of the shaft which provides a lubricant space in communication with said lubricant duct, comprising a diaphragm secured to the lower end of the housing, and a sealing ring on the diaphragm which bears upon the upper end of the roller, the housing being formed with recesses and the diaphragm provided with pins adapted to have a sliding fit in said recesses.

38. In apparatus of the character described, the combination of a housing formed at its upper end with a lubricant chamber, a shaft fixed in the lower end of the housing and formed with a longitudinally extending lubricant duct, a head on the lower end of the shaft, a roller revolubly mounted on the shaft, one or more thrust rings interposed between the head and the roller, a cap inclosing the lower end of the shaft which provides a lubricant space in communication with said lubricant duct, comprising a diaphragm secured to the lower end of the housing, a sealing ring on the diaphragm which bears upon the upper end of the roller, the housing being formed with recesses and the diaphragm provided with pins adapted to have a sliding fit in said recesses, and springs which are interposed between the housing and diaphragm.

39. In apparatus of the character described, the combination with a shaft, of a roller on said shaft, a cap to inclose the end of the shaft; said roller consisting of cast metal and having tubular metal elements cast therein and projecting therefrom and bolts extending through said tubular member and cap for attaching the cap to the roller.

40. The combination with a roller, of a shaft sustained in substantially vertical position providing a bearing for said roller and formed with a longitudinally extending lubricant duct arranged to supply lubricant to the bearing surfaces of the roller and shaft, and means constituting a lubricant chamber at the upper end of said shaft.

41. The combination with a roller, of a shaft sustained in substantially vertical position providing a bearing for said roller and formed with a longitudinally extending lubricant duct arranged to supply lubricant to the bearing surfaces of the roller and shaft, and spring pressed sealing means surrounding the shaft above the roller to prevent the waste of lubricant.

42. The combination with a roller, of a shaft sustained in substantially vertical position providing a bearing for said roller and formed with a longitudinally extending lubricant duct arranged to supply lubricant to the bearing surfaces of the roller and shaft, and sealing means surrounding the shaft above the roller to prevent the escape of lubricant comprising a flexible diaphragm.

43. The combination with a roller, of a shaft sustained in substantially vertical position providing a longitudinally extending bearing for the roller, and means at the lower end of the shaft providing a thrust bearing for the roller, said structure being formed with a lubricant duct arranged to supply lubricant to the bearing surfaces at the lower end of the shaft and spring pressed sealing means surrounding the shaft and bearing upon the upper end of the roller.

44. The combination with a roller, of a shaft sustained in substantially vertical position providing a longitudinally extending bearing for the roller, means at the lower end of said shaft providing a thrust bearing for the roller, a cap surrounding the lower end of the shaft and providing a lubricant space, said shaft being formed with a lubricant duct extending therethrough and communicating with said lubricant space in the cap and spring pressed sealing means surrounding the shaft and bearing upon the upper end of the roller.

45. The combination with a roller, of a shaft sustained in substantially vertical position providing a longitudinally extending bearing for the roller, means at the lower end of said shaft providing a thrust bearing for the roller, a cap surrounding the lower end of the shaft and attached to the roller providing a lubricant space, said shaft being formed with a lubricant duct extending therethrough and communicating with said lubricant space in the cap and spring pressed sealing means surrounding the shaft and bearing upon the upper end of the roller.

46. The combination with a roller, of a shaft sustained in substantially vertical position providing a longitudinally extending bearing for the roller, means at the lower end of said shaft providing a thrust bearing for the roller, a cap surrounding the lower end of the shaft and attached to the roller providing a lubricant space, said structure being formed with a lubricant duct arranged to supply lubricant to the bearing surfaces of the roller and shaft and spring pressed sealing means surrounding the shaft and bearing upon the upper end of the roller.

47. The combination with a roller, of a shaft sustained in substantially vertical position having a head at its lower end, thrust rings between said head and roller channeled to force oil centripetally, a cap attached to the roller and surrounding and spaced from said head and thrust rings to form a lubricant chamber, said shaft being formed with a lubricant duct communicating at its lower end with said lubricant chamber.

48. The combination with a roller, of a shaft sustained in substantially vertical position having a head at its lower end and thrust rings between said head and roller, said roller being formed with a lubricant duct arranged to supply lubricant to said thrust rings, one or more of said rings being formed on their bearing faces with eccentric oil grooves.

49. The combination with a roller, of a shaft sustained in substantially vertical position having a head at its lower end, thrust rings between said head and roller, a cap attached to the roller and surrounding and spaced from said head and thrust rings to form a lubricant chamber, said shaft being formed with a lubricant duct communicating at its lower end with said lubricant chamber, one or more of said rings being formed with eccentric oil grooves on their bearing faces which are positioned to force oil centripetally.

50. The combination with a roller, of a shaft sustained in substantially vertical position on which the roller is revolubly mounted, means at the lower end of the shaft providing a thrust bearing for the roller, and a holder providing a lubricant space surrounding the same, said shaft being formed with a lubricant duct communicating with said lubricant space and spring pressed sealing means surrounding said shaft and bearing upon the upper end of said roller.

51. The combination with a roller, of a shaft sustained in substantially vertical position on which the roller is revolubly mounted, means at the lower end of the shaft providing a thrust bearing for the roller, and a holder providing a lubricant space surrounding the same, said structure being formed with a lubricant duct which supplies lubricant to said lubricant space and spring pressed sealing means surrounding said shaft and bearing upon the upper end of said roller.

52. The combination with a roller, of a shaft on which said roller is revolubly mounted, and a substantially vertically sustained housing in which the upper end of the shaft is fixed, formed so as to constitute a lubricant chamber above the shaft; the above specified structure being formed with a longitudinally extending lubricant duct arranged to supply lubricant to the bearing surfaces of said shaft and roller.

53. The combination with a roller, of a shaft on which said roller is revolubly mounted, and a substantially vertically sustained housing in which the upper end of the shaft is fixed, formed so as to constitute a lubricant chamber above the shaft;

the above specified structure being formed with a longitudinally extending lubricant duct arranged to supply lubricant to the bearing surfaces of said shaft and roller which extends from the lubricant chamber to the bearing surfaces at the lower end of said shaft.

54. The combination with a roller, of a shaft on which said roller is revolubly mounted, and a substantially vertically sustained housing in which the upper end of the shaft is fixed, formed so as to constitute a lubricant chamber above the shaft; the above specified structure being formed with a longitudinally extending lubricant duct arranged to supply lubricant to the bearing surfaces of said shaft and roller which extends from the lubricant chamber to the bearing surfaces at the lower end of said shaft, and sealing elements arranged around said shaft above the roller to prevent the escape of lubricant.

55. The combination with a roller, of a shaft on which said roller is revolubly mounted, and a substantially vertically sustained housing in which the upper end of the shaft is fixed, formed so as to constitute a lubricant chamber above the shaft; the above specified structure being formed with a longitudinally extending lubricant duct arranged to supply lubricant to the bearing surfaces of said shaft and roller which extends from the lubricant chamber to the bearing surfaces at the lower end of said shaft, sealing elements arranged around said shaft above the roller to prevent the escape of lubricant, and elastic means for keeping said sealing elements in contact.

56. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, and spring pressed sealing means arranged between the roller and the housing to prevent the waste of lubricant above the roller.

57. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, sealing elements arranged between the roller and the housing to prevent the waste of lubricant above the roller, and elastic means for keeping said sealing elements in contact with each other.

58. In apparatus of the character described, the combination with a shaft terminating in a head, of a roller revoluble on said shaft, one or more thrust rings between said head and roller; means providing a lubricant space around said head and thrust rings, and spring pressed sealing means surrounding said shaft and bearing on the upper end of the roller, said structure being provided with a lubricant duct which supplies lubricant to the bearing surfaces of said shaft, roller and thrust rings.

59. In apparatus of the character described, the combination with a shaft terminating in a head, of a roller revoluble on said shaft, one or more thrust rings between said head and roller, spring pressed sealing means surrounding said shaft and bearing on the upper end of said roller and a cap which surrounds and is spaced the head and thrust rings providing a lubricant space; said shaft being formed with a lubricant duct extending therethrough and communicating with said lubricant space.

60. In apparatus of the character described, the combination with a shaft terminating in a head, of a roller revoluble in said shaft, one or more thrust rings between said head and roller, a cap which surrounds the head and thrust rings providing a lubricant space, said shaft being formed with a lubricant duct extending therethrough and communicating with said lubricant space, and sealing means at the upper end of the roller which checks the outflow of lubricant between the roller and shaft.

ROBERT A. LACHMANN.

Witnesses:
G. Y. SKINNER,
L. A. FALKENBERG.